United States Patent [19]

Coll-Palagos et al.

[11] 4,108,599

[45] Aug. 22, 1978

[54] HIGH WATER CONTENT EMULSION CLEANING

[75] Inventors: Miguel Coll-Palagos, Rye; James H. Surridge, Stony Point, both of N.Y.

[73] Assignee: Stauffer Chemical Company, Westport, Conn.

[21] Appl. No.: 647,960

[22] Filed: Jan. 9, 1976

[51] Int. Cl.$^2$ .............................................. B08B 3/00
[52] U.S. Cl. ...................................... 8/137; 68/18 R; 204/188; 208/179; 210/59; 252/358
[58] Field of Search .................. 8/142, 137; 68/18 R; 204/186, 188, 190; 208/179; 210/43, 59, 60; 252/170, 171, 172, 358

[56] References Cited

U.S. PATENT DOCUMENTS

| 1,222,637 | 4/1917 | Landreth | 210/59 |
|---|---|---|---|
| 1,911,289 | 5/1933 | Reddish | 252/171 |
| 1,979,399 | 11/1934 | Morgen | 208/179 |
| 1,993,761 | 3/1935 | Tippins | 252/358 |
| 2,083,798 | 6/1937 | Roberts | 204/188 |
| 2,204,812 | 6/1940 | Muskat | 252/358 |
| 2,378,323 | 6/1945 | Pomeroy | 252/358 |
| 3,412,003 | 11/1968 | Tokumoto | 204/186 |
| 3,674,677 | 4/1972 | Roberts | 204/188 |
| 3,728,074 | 4/1973 | Victor | 252/171 |
| 3,940,334 | 2/1976 | Miyazawa | 210/43 |

FOREIGN PATENT DOCUMENTS

| 2,405,703 | 8/1974 | Fed. Rep. of Germany. |
|---|---|---|
| 550,595 | 5/1974 | Switzerland. |

*Primary Examiner*—William E. Schulz
*Attorney, Agent, or Firm*—Michael E. Zall

[57] ABSTRACT

The present invention relates to a process of fabric cleaning utilizing a solvent emulsion which effectively combines the dissolving and suspending power of water for hydrophilic substances with the dissolving power of organic compositions for hydrophobic substances. The factor lending economic practicability to the process is the breaking of the emulsion after it has performed its cleaning function whereby only the organic fraction thereof undergoes distillation cleansing.

17 Claims, No Drawings

HIGH WATER CONTENT EMULSION CLEANING

BACKGROUND OF THE INVENTION

In conventional dry cleaning processes soiled fabrics and the like are washed with a substantially anhydrous dry cleaning solvent such as trichloroethylene, perchloroethylene or a petroleum base hydrocarbon such as Stoddard solvent or naphtha. The solvent effects the release of some soils from the fabric and the dissolution of solvent soluble soils, the latter group consisting primarily of fats, oils, waxes, hydrocarbons and fatty acids.

The other principal type of soluble soil which must be removed from fabrics is that which is water soluble. These soils derive chiefly from perspiration and food and beverage spillage and consist primarily of salts, carbohydrates and proteins. Small amounts of water, on the order of 0.02 to 0.12%, are frequently used in combination with the organic solvent in current dry cleaning operations. This is usually as a preparatory treatment for the removal of water soluble stains from the fabric whereby only the surface of the fabric is momentarily wetted by any water. The idea behind this minute addition of water is that the water will wet and swell water soluble stains, thereby loosening their bond with the fabric so that they can be detached by the mechanical action of the washer. In practice, such operations perform very poorly with regard to removal of water soluble soils. Also, the use of soaps in such operations to aid in removal of water soluble soils and soils which, while not water soluble are nevertheless hydrophilic, is quite inefficient due to the low water content in the solvent.

Another approach to the addition of water to organic cleaning solvents is the system wherein a detergent is used which forms a stable colloidal solution, in the solvent, of aggregates of molecules called micelles. These micelles possess a hydrophilic interior and are capable of dissolving water which, in turn, is capable of dissolving water soluble soil. Thus, water is completely solubilized by a dry-cleaning detergent but the water content is still low and consequently such systems also have very limited removal power for water soluble soils. This so-called "charged system" has been largely abandoned in modern cleaning practices and water is now added batchwise as an emulsion with the organic solvent, as a spray or in the form of steam. The amount of water added varies from about 0.5 to about 7%, calculated on the weight of fabric, depending upon the particular cleaning application.

Thus, in fabric cleaning operations, the solvent charge, inter alia, serves the dual role of removing non-aqueous soluble soils as well as water soluble soils. While the preponderance of non-aqueous content of the solvent can readily handle the non-aqueous soluble soils, the small amounts of water addition to which most current practices are limited severely curtails the effective simultaneous removal of water soluble soils. This deficiency causes severe problems in the fabric cleaning industry. Following cleaning with a solvent of inadequate water soluble soil removing capability, an article must either be returned as is or subjected to expensive "wet-cleaning" whereby water soluble soil which has become imbedded in the fibers is wetted by an aqueous detergent solution and gently worked by hand brushing. Obviously, neither course is desirable.

Thus, small amounts of water are often used in fabric cleaning but the water is always either completely dissolved in micellar form or in such small quantity that only the surface of the fabrics can be momentarily wetted. Consequently, the result in conventional practice has been that the formulation of cleaning solvents has compromised the thoroughness with which fabrics can be cleaned because such solvents contain too little water.

It has been pointed out in the literature that two-phase or emulsion cleaning, utilizing an emulsion of an organic cleaning composition with a high water content and a suitable surfactant, provides remarkably good cleaning characteristics. This two-phase approach, with regard to the critical parameters of soil removal and redeposition, achieves markedly superior results to those obtained using pure organic solvent (drycleaning) or cleaning in aqueous media (laundering). Further testing has demonstrated the direct relationship between increasing the water content in such a two-phase cleaning solvent emulsion and the improvement in the overall cleaning performance.

While there are certain ancillary problems in using a high water content emulsion cleaning solvent (eg., difficulty in filtration to remove insolubles), the primary reason why such emulsions are not routinely utilized is that the post-use recovery of the expensive organic fraction is uneconomical.

The principal method of purification of cleaning solvents in the United States is by distillation. Following separation of the solvent from the cleaned fabrics it may first be filtered by various means to remove insoluble material which has been picked up in the cleaning process. Eventually, however, the solvent will be cleansed by distillation, a very costly operation. The distillation is necessary to remove solvent soluble contaminants from the cleaning solvent. Also removed are insoluble materials which have not previously been separated from the solvent by filtration. The distillation carried on in conventional cleaning operations effects delivery of the liquid cleaning solvent, including the water fraction thereof, to a separating device wherein the water and organic fractions are separated prior to succeeding reuse of the expensive organic fraction. The water fraction is discarded or reused depending upon the nature of the operation, the volume involved etc.

It is clear that a large increase in the water content of the solvent to be distilled will dramatically increase the cost/benefit ratio of the distillation operation since the distilled water has little value relative to the organic fraction and particularly because water requires about ten times as great a thermal input to distill than does an organic solvent such as perchloroethylene. Thus, the fabric cleaning industry is faced with the desirability of using high water content solvents from the standpoint of optimizing cleaning capability while simultaneously being unable to do so without such large expenditures for energy that the cleaning process itself may be rendered uneconomical. Clearly, the problem of efficient solvent separation and recovery is of critical importance to any practical application of two-phase emulsion cleaning.

Another major problem encountered in the fabric cleaning industry, particularly in the cleaning of heavily soiled industrial work, is the removal of large quantities of insoluble soil and contaminants from the solvent prior to reuse. Fabrics to be cleaned such as work overalls, shop towels, floor mats, mops and the like contain up to ten times the amount of insoluble soil found in lighter work such as suits, dresses and household items.

Such high concentrations of insoluble soil exceed conventional filter capacity and lead to filter clogging, solvent backup and excessive equipment downtime. Of the attempts to deal with the problem of high solvent contamination by insoluble matter, distillation in on-site stills has been the most successful. However, in removal of such large quantities of insoluble matter the efficiency of a still decreases rapidly due to encrustations which form on heat exchange surfaces. As with the filtration problems with heavy insoluble content solvent, such solvents also necessitate expensive shutdowns of distillation equipment. Thus, it would be desirable to deliver solvent to the still with as small a content of insolubles as possible.

It is an object of this invention to introduce a process of fabric cleaning which renders the use of cleaning solvents with functionally optimal water contents economically practicable.

Another object of the invention is to largely obviate the need for solvent filtration steps in fabric cleaning processes.

A further object of the invention is to provide a fabric cleaning process wherein an organic drycleaning composition is delivered for distillation cleansing with a low content of insoluble impurities.

SUMMARY OF THE INVENTION

The process of the invention involves the economical utilization of fabric cleaning solvents which are effective in the removal of virtually all commonly encountered soils. Such soils are foreign substances found in fabrics and which are soluble in water as well as those soluble in organic drycleaning compositions. The solvents involved are emulsions of organic drycleaning compositions and water, the latter component being present in greater quantity than has heretofore been expedient due to the cost of its separation from the organic drycleaning composition by distillation. The commercially practical use of such solvents is made possible by the process of the invention whereby the solvent, after performing its cleaning functions is demulsified to its water and organic drycleaning composition constituents and the latter fraction alone is cleansed by distillation.

By the use of this process, not only is the desirable use of high water content cleaning solvents rendered economical but, since a large portion of the insoluble soils in the solvent is retained in the water fraction of the broken emulsion, very costly filtration processes, heretofore essential in conventional practice, are rendered virtually unnecessary.

An additional benefit of the process of the invention is the low content of the insolubles present in the organic drycleaning composition which is delivered for distillation.

DESCRIPTION OF THE INVENTION

The various objectives of the invention are achieved by embodiments which function in conjunction with fabric cleaning apparatus. The word "fabric," as used herein, is intended to include natural or synthetic fibrous cloth material requiring periodic removal of foreign substances.

It has been reported that high water content cleaning solvents in emulsion form give excellent cleaning performance. In particular, it has been found that organic drycleaning compositions and water, emulsified with a suitable surfactant composition and optionally containing a detergent composition, perform very well when the water content is in excess of 30 percent. As indicated, the greatest single factor which militates against the use of such solvent compositions is the extremely high cost, in energy, of recovery of the organic cleaning composition fraction by distillation. By the practice of the process of the invention, this problem is obviated by demulsification of the solvent emulsion and subsequent distillation of only the organic cleaning composition fraction.

Two preferred embodiments for practicing the invention involve chemical and electrochemical methods respectively.

The chemical approach comprises direct chemical addition to the solvent emulsion whereby the emulsion splits and yields a practically 100% organic solvent fraction and a water fraction. The organic fraction can then be economically cleansed by distillation for reuse in the fabric cleaning cycle. A wide variety of compounds can be utilized for the chemical addition and several illustrative examples are given below. Other useful compounds will readily occur to those skilled in the art. Similarly, while the relationship between the amount of chemical added and the efficacy of the demulsification is a direct one, those skilled in the art can readily determine economically practical amounts. While the precise mechanism of the reaction is not clear, the surfactant emulsifiers are "salted out" by the chemical addition and remain dissolved in the broken emulsion.

Organic solvent losses are held to a minimum in practicing this embodiment of the invention. The water fraction of the broken emulsion actually contains two layers. One of these constitutes most of the water and is clear while an interface layer exists between the clear water layer and the organic fraction. The clear water layer has been found by analyses to contain amounts of organic solvent on the order of one-tenth of one percent. This is a negligible and readily expendable amount. The interface layer, which contains most of the insoluble soils picked up by the solvent during the cleaning process, contains a somewhat higher percentage of organic solvent. Similarly, however, the loss of this solvent does not entail appreciable expense since the overall volume of the interface layer is quite small in relation to the total volume of the water fraction of the emulsion.

The chemical treatment embodiment is equally applicable to continuous or batch process parameters. A determination of which approach is desirable in a given situation will depend upon the nature of the cleaning operation under consideration.

The electrochemical embodiment of the invention involves electrophoretic migration of the surfactant emulsifiers and their decomposition at electrodes in conventional electrolytic apparatus. Following the cleaning cycle, the solvent emulsion is directed to an electrolytic cell. Various types of electrodes may be utilized. Particularly suitable are the DSA type of electrodes which include, for example, platinized titanium. An electrolyte such as HCl, NaOH, NaCl, $Al_2(SO_4)_3 \cdot 18H_2O$ or $AlCl_3$ is added in sufficient quantity to transform the water phase of the emulsion into an electrolytic solution and voltage of from about 5 volts to about 20 volts is applied. The applied voltage may vary from these values depending upon electrolyte strength, electrode distance etc. These factors are well known to those skilled in the electrochemical art and need be dealt with no further here.

It has been found that under the conditions outlined above, virtually complete demulsification of the solvent emulsion occurs within about ten minutes. Here, as with the chemical embodiment, the nearly pure organic solvent fraction is ready for distillation cleansing. Also, as with the chemical embodiment, the separated water fraction contains two layers and the same factors regarding organic solvent loss therefrom apply.

It has been found that following demulsification, the water fraction, and particularly the interface layer, contains an extremely high proportion of the insoluble matter which the emulsion solvent picked up during the fabric cleaning cycle. Thus filtration of the organic fraction prior to delivery to the still is unnecessary. Additionally, the use of fluidized activated carbon in the electrolytic cell during the process will further reduce contaminants by adsorption.

While the described embodiments are preferred, it should be noted that they are purely illustrative of the process of the invention. Various selective or electrolyzed membrane techniques and the like can also be utilized to achieve the objectives of the invention.

The emulsion cleaning solvent compositions which can be used in practicing the present invention are comprised of water, an organic drycleaning fraction and suitable surfactants for emulsification and detergency. The organic drycleaning fraction can be any of the solvents conventionally used in drycleaning. These include, but are not limited to, the petroleum distillate solvents such as Stoddard solvent and 140-F Solvent and the halogenated hydrocarbon solvents. A preferred organic drycleaning compound is tetrachloroethylene because of its well known beneficial characteristics in cleaning operations.

Since distillation recovery of an organic solvent fraction becomes uneconomical where the water content of the solvent exceeds about 6%, the relative volumes of water and organic drycleaning composition comprising the emulsions whereby the invention can be advantageously practiced are volumetric ratios of about 7:93 to about 95:5 parts of water to parts of organic drycleaning composition. Preferred emulsion compositions have a water content of 30% or greater and the particularly preferred range is about 30 to about 50% water.

While nonionic and anionic surfactant compositions and combinations thereof are preferred, cationic and nonionic-cationic formulations can also be utilized. The chief requisites of surfactants useful in the practice of the invention are adequate emulsification capability, good detergency and, of course, susceptibility to demulsification. Excellent results have been achieved by the use of nonionic-anionic formulations utilizing ethoxylated alkylphenols such as Surfonic N-40 or N-95 (Jefferson Chemical Co., Inc.) for the nonionic function and alkylbenzenesulfonate products to impart anionic activity. The practice of formulating surfactant compositions is well known to those skilled in the fabric cleaning arts and need not be elaborated further here.

It should be noted that certain conventional modifications may be introduced into the fabric cleaning-demulsification-distillation sequence of the process of the invention without effecting any material departure therefrom. For example, a device for separating liquids of differing densities could be utilized between the demulsification and distillation steps to remove any water carry over from the emulsion breaking procedure. Such devices are described in U.S. Pat. Nos. 3,269,155 and 3,451,234.

The following examples will serve to more fully illustrate the process of the present invention and its efficacy.

EXAMPLE 1

This example illustrates overall fabric cleaning capability in relation to water content of the cleaning emulsion. The organic solvent used was tetrachoroethylene and the surfactant was a commercial nonionic-anionic formulation used at a concentration of 0.6% by volume. The percentage soil removal and percentage whiteness retention were determined by reflectance measurements utilizing a Hunter Laboratories D-25 Color and Color Difference Meter. The soil removal tests were performed using standard cotton test swatches provided by the American Fiber Service while the whiteness retention tests utilized 65:35 polyester-cotton test swatches with permanent press finish supplied by Deering Milliken Company. The tests for percentage salt removal utilized standard rayon test swatches impregnated with salt, supplied by the International Fabric Care Institute and the analytical determinations were made by titration with $Hg(NO_3)_2$. All tests were conducted at 27° C. The results are the average figures from three tests and are summarized in Table 1.

TABLE 1

| Volumetric Ratio of Tetrachloroethylene to water | Percent Soil Removal | Percent Whiteness Retention | Percent Salt Removal |
|---|---|---|---|
| 100:0 | 31 | 82 | 46 |
| 99:1 | 49 | 94 | 62 |
| 98:2 | 35 | 96 | 74 |
| 97:3 | 35 | 95 | 80 |
| 94:6 | 44 | 94 | 98 |
| 90:10 | 46 | 95 | 99 |
| 80:20 | 50 | 97 | 99 |
| 70:30 | 56 | 98 | 100 |
| 60:40 | 58 | 98 | 100 |
| 50:50 | 58 | 98 | 100 |

EXAMPLE 2

This example demonstrates the emulsion breaking capability of various compounds. The emulsion employed had completed a standard fabric cleaning cycle and was 70:30 parts by volume tetrachloroethylene to water. The surfactant formulation for the $AlCl_3$ and $Al_2(SO_4)_3 \cdot 18H_2O$ tests was the same as that in Example 1. All other tests utilized an anionic-nonionic-cationic surfactant formulation at a concentration of 0.5%. The tests indicated in Table 2 were conducted by the addition of the enumerated compounds to 50 ml. portions of the emulsion.

TABLE 2

| Compound | Amount Added | Volume: % Increase | Separation Time |
|---|---|---|---|
| Alum Crystals | 1 g. | — | No Separation |
| NaCl 20% soln. | 50 ml. | 100 | Immediately |
| NaCl 5% soln. | 50 ml. | 100 | ½ hour |
| $FeCl_3$ Crystals | 0.5 g. | — | >1 hour |
| $H_2SO_4$ 5% soln. | 50 ml. | 100 | Immediately |
| NaOH 20% soln. | 50 ml. | 100 | Immediately |
| NaOH 20% soln. | 5 ml. | 10 | >1 hour |

TABLE 2-continued

| Compound | Amount Added | Volume: % Increase | Separation Time |
|---|---|---|---|
| 10% soln. NaOH | 10 ml. | 20 | 15 minutes |
| 10% soln. NaOH | 15 ml. | 30 | 3 minutes |
| 10% soln. NaOH | 20 ml. | 40 | Immediately |
| 5% soln. AlCl$_3$ | 20 ml. | 40 | >1 hour |
| 35% soln. Al$_2$(SO$_4$)$_3$ · 18H$_2$O | 0.4 ml. | <1 | <1 minute |
| 63% soln. | 1.25 ml. | 2.5 | <15 minutes |

EXAMPLE 3

This example illustrates the utility of the electrochemical embodiment of the invention. The process involved is continuous emulsion electrolysis wherein an electrolytic cell was equipped with four 2 × 4 inch platinized titanium electrodes spaced ⅛ inch apart, an inlet conduit from an emulsion reservoir and outlet conduits for removal of the water and organic fractions. The composition of the emulsion utilized was 540 ml. tetrachloroethylene, 360 ml. water and 4.7 ml. of the surfactant composition of Example 1. The electrolyte was prepared by dissolving 9 g. NaCl in 80 ml. of water.

Forty ml. of the NaCl solution was placed in the cell prior to electrolysis and, at an emulsion flow rate of 60 ml./minute, a voltage of 5-6 volts was applied at a current of 0.75-1 amperes for 15 minutes. During the electrolysis, 10 additional ml. of NaCl solution was added and, after 15 minutes, the emulsion reservoir was flushed with 100 ml. of water.

A total of 538 ml. of tetrachloroethylene was recovered which, by analysis, had a water content of 0.12% by volume.

The chemical and electrochemical embodiments can also be advantageously used in conjunction with each other either as sequential process steps in the emulsion breaking or as an integrated step utilizing the same process vessel. Such use might be indicated, for example, where the relative cost of treatment chemicals and electricity is a serious consideration.

What is claimed is:

1. A process for reclaiming and regenerating spent drycleaning solvent from an emulsion consisting essentially of an organic drycleaning solvent, water and a surfactant, said process comprising breaking said emulsion by electrolysis in the presence of an electrolyte or by contacting said emulsion with an effective amount of a demulsifying compound, and recovering said organic drycleaning solvent therefrom by distillation, wherein the organic drycleaning solvent and water in said emulsion are present in a ratio by volume of about 7:93 to about 95:5 parts of the water to the organic dry cleaning solvent.

2. The process of claim 1 wherein said ratio by volume is about 30:70 to about 95:5 parts of the water to the organic drycleaning solvent.

3. The process of claim 2 wherein said ratio by volume is about 30:70 to about 60:40 parts of the water to the organic drycleaning solvent.

4. The process of claim 3 wherein said ratio by volume is about 30:70 to about 50:50 parts of the water to the organic drycleaning solvent.

5. The process of claim 1 wherein said breaking of said emulsion is effected by electrolysis in the presence of an electrolyte.

6. The process of claim 5 wherein sodium chloride is utilized as said electrolyte.

7. The process of claim 5 wherein sodium hydroxide is utilized as said electrolyte.

8. The process of claim 5 wherein hydrochloric acid is utilized as said electrolyte.

9. The process of claim 5 wherein aluminum chloride is utilized as said electrolyte.

10. The process of claim 5 wherein aluminum sulfate eighteen hydrate is utilized as said electrolyte.

11. The process of claim 1 wherein said breaking of said emulsion is effected by contacting said emulsion with an effective amount of a demulsifying compound.

12. The process of claim 11 wherein said demulsifying compound is sodium chloride.

13. The process of claim 11 wherein said demulsifying compound is ferric chloride.

14. The process of claim 11 wherein said demulsifying compound is sulfuric acid.

15. The process of claim 11 wherein said demulsifying compound is sodium hydroxide.

16. The process of claim 11 wherein said demulsifying compound is aluminum chloride.

17. The process of claim 11 wherein said demulsifying compound is aluminum sulfate eighteen hydrate.

* * * * *